US012770220B2

(12) United States Patent
Sio et al.

(10) Patent No.: US 12,770,220 B2
(45) Date of Patent: Oct. 20, 2026

(54) IMAGE ENLARGING APPARATUS AND IMAGE ENLARGING METHOD THEREOF HAVING DEEP LEARNING MECHANISM

(71) Applicant: REALTEK SEMICONDUCTOR CORPORATION, Hsinchu (TW)

(72) Inventors: Chon-Hou Sio, Hsinchu (TW); Chia-Wei Yu, Hsinchu (TW); Kang-Yu Liu, Hsinchu (TW); Yen-Ying Chen, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 377 days.

(21) Appl. No.: 18/376,074

(22) Filed: Oct. 3, 2023

(65) Prior Publication Data

US 2024/0119559 A1 Apr. 11, 2024

(30) Foreign Application Priority Data

Oct. 7, 2022 (TW) ................................. 111138225

(51) Int. Cl.
*G06T 3/4053* (2024.01)

(52) U.S. Cl.
CPC .................................. *G06T 3/4053* (2013.01)

(58) Field of Classification Search
CPC ....... G06T 3/4053; G06T 3/4046; G06T 5/60; G06V 10/82; G06N 3/0464
See application file for complete search history.

(56) References Cited

U.S. PATENT DOCUMENTS

| | | | | |
|---|---|---|---|---|
| 10,664,963 B1 * | 5/2020 | Rossi | ..................... | G06N 5/046 |
| 2009/0110285 A1 * | 4/2009 | Elad | ..................... | G06T 3/4053 382/254 |

(Continued)

FOREIGN PATENT DOCUMENTS

| | | | |
|---|---|---|---|
| CN | 110796103 A | 2/2020 | |
| KR | 20200135102 A * | 12/2020 | ............... G06N 3/08 |

(Continued)

OTHER PUBLICATIONS

Wang et at. "Dual Super-Resolution Learning for Semantic Segmentation", 2020, Computer Vision and Pattern Recognition, IEEE Xplore.

(Continued)

*Primary Examiner* — Stephen R Koziol
*Assistant Examiner* — Michael Kim Maiden
(74) *Attorney, Agent, or Firm* — WPAT, PC

(57) ABSTRACT

The present disclosure discloses an image enlarging apparatus having deep learning mechanism. A deep learning circuit includes an image downsizing circuit, an image characteristic analyzing circuit, a weighting reallocating circuit and an image upsizing circuit. The image downsizing circuit downsizes an input image to generate a downsized image. The image characteristic analyzing circuit analyzes the downsized image according to image characteristics to generate categorized images. The weighting reallocating circuit performs weighting reallocating on the categorized images according to image weighting parameters corresponding to the image characteristics to generate weighting reallocated images. The image upsizing circuit upsizes the weighting reallocated images to generate adjusted images. A concatenating circuit concatenates the input image and the adjusted images to generate concatenated images. A super-resolution enlarging circuit performs super-resolution (Continued)

enlarging on the concatenated images to generate an output image.

14 Claims, 2 Drawing Sheets

(56) References Cited

U.S. PATENT DOCUMENTS

| | | | | |
|---|---|---|---|---|
| 2022/0292636 | A1 | 9/2022 | Chen | |
| 2023/0196585 | A1* | 6/2023 | Nachum | G06T 3/40 382/103 |

FOREIGN PATENT DOCUMENTS

| | | | |
|---|---|---|---|
| TW | 202044196 | A | 12/2020 |
| TW | 202236208 | A | 9/2022 |

OTHER PUBLICATIONS

Ledig et al. "Photo-Realistic Single Image Super-Resolution Using a Generative Adversarial Network", May 25, 2017, Computer Vision and Pattern Recognition, IEEE Xplore.

OA letter of a counterpart TW application (appl. No. 111138225) mailed on Sep. 5, 2023. Summary of the TW OA letter: 1. Claims 1-10 are rejected as allegedly being unpatentable in view of cited reference 1 (TW 202044196 A), cited reference 2 (CN110796103A) and cited reference 3 (TW 202236208 A, also published as US20220292636A1). Correspondence bewteen claims of TW counterpart application and claims of US application.

* cited by examiner

IMAGE ENLARGING APPARATUS AND IMAGE ENLARGING METHOD THEREOF HAVING DEEP LEARNING MECHANISM

BACKGROUND OF THE INVENTION

1. Field of the Invention

The present disclosure relates to an image enlarging apparatus and an image enlarging method thereof having deep learning mechanism.

2. Description of Related Art

Conventional image enlarging technologies are not able to increase the resolution of an enlarged image. As a result, blurriness, unclear edges and noises are easily observed in the enlarged image. In recent years, the technology of image super resolution is widely used in daily life, in which the object of such a technology is to obtain a high-resolution (HR) image from a low-resolution (LR) image and keeps the details thereof as much as possible.

Along with the improvement of the current digital resolution of the display apparatuses, the image enlarging technology equipped with the image super resolution mechanism is even more important while the resolution improves from full high definition (HD) to ultra HD. Whether the enlarged image can be adjusted as a whole and be enhanced according to local image characteristics at the same time becomes a critical issue.

SUMMARY OF THE INVENTION

In consideration of the problem of the prior art, an object of the present disclosure is to provide an image enlarging apparatus and an image enlarging method thereof having deep learning mechanism.

The present invention discloses an image enlarging apparatus having deep learning mechanism that includes a deep learning circuit, an image concatenating circuit and a super-resolution image enlarging circuit. The deep learning circuit includes an image downsizing circuit, an image characteristic analyzing circuit, a weighting reallocating circuit and an image upsizing circuit. The image downsizing circuit is configured to downsize an input image to generate a downsized image. The image characteristic analyzing circuit is configured to analyze the downsized image according to a plurality of image characteristics to generate a categorization map. The weighting reallocating circuit is configured to perform weighting reallocating on the categorization map according to a plurality of groups of image weighting parameters corresponding to the image characteristics to generate a weighting reallocating map. The image upsizing circuit is configured to upsize the weighting reallocating map to generate an adjusting map. The image concatenating circuit is configured to concatenate the input image and the adjusting map to generate a concatenated image. The super-resolution image enlarging circuit is configured to perform super-resolution enlarging on the concatenated image to generate an output image.

The present invention also discloses an image enlarging method having deep learning mechanism used in an image enlarging apparatus that includes steps outlined below. An input image is downsized to generate a downsized image by an image downsizing circuit included by a deep learning circuit. The downsized image is analyzed according to a plurality of image characteristics to generate a categorization map by an image characteristic analyzing circuit included by the deep learning circuit. Weighting reallocating is performed on the categorization map according to a plurality of groups of image weighting parameters corresponding to the image characteristics to generate a weighting reallocating map by a weighting reallocating circuit included by the deep learning circuit. The weighting reallocating map is upsized to generate an adjusting map by an image upsizing circuit included by the deep learning circuit. The input image and the adjusting map are concatenated to generate a concatenated image by an image concatenating circuit. Super-resolution enlarging is performed on the concatenated image to generate an output image by a super-resolution image enlarging circuit.

These and other objectives of the present disclosure will no doubt become obvious to those of ordinary skill in the art after reading the following detailed description of the preferred embodiments that are illustrated in the various figures and drawings.

DETAILED DESCRIPTION OF THE PREFERRED EMBODIMENTS

An aspect of the present invention is to provide an image enlarging apparatus and an image enlarging method thereof having deep learning mechanism to perform deep learning on the input image according to different image characteristics by a deep learning circuit disposed on a path independent from the image enlarging processing path so as to enhance the enlarged input image to accomplish an image enlarged result having super resolution mechanism applied thereto.

Figure 1:
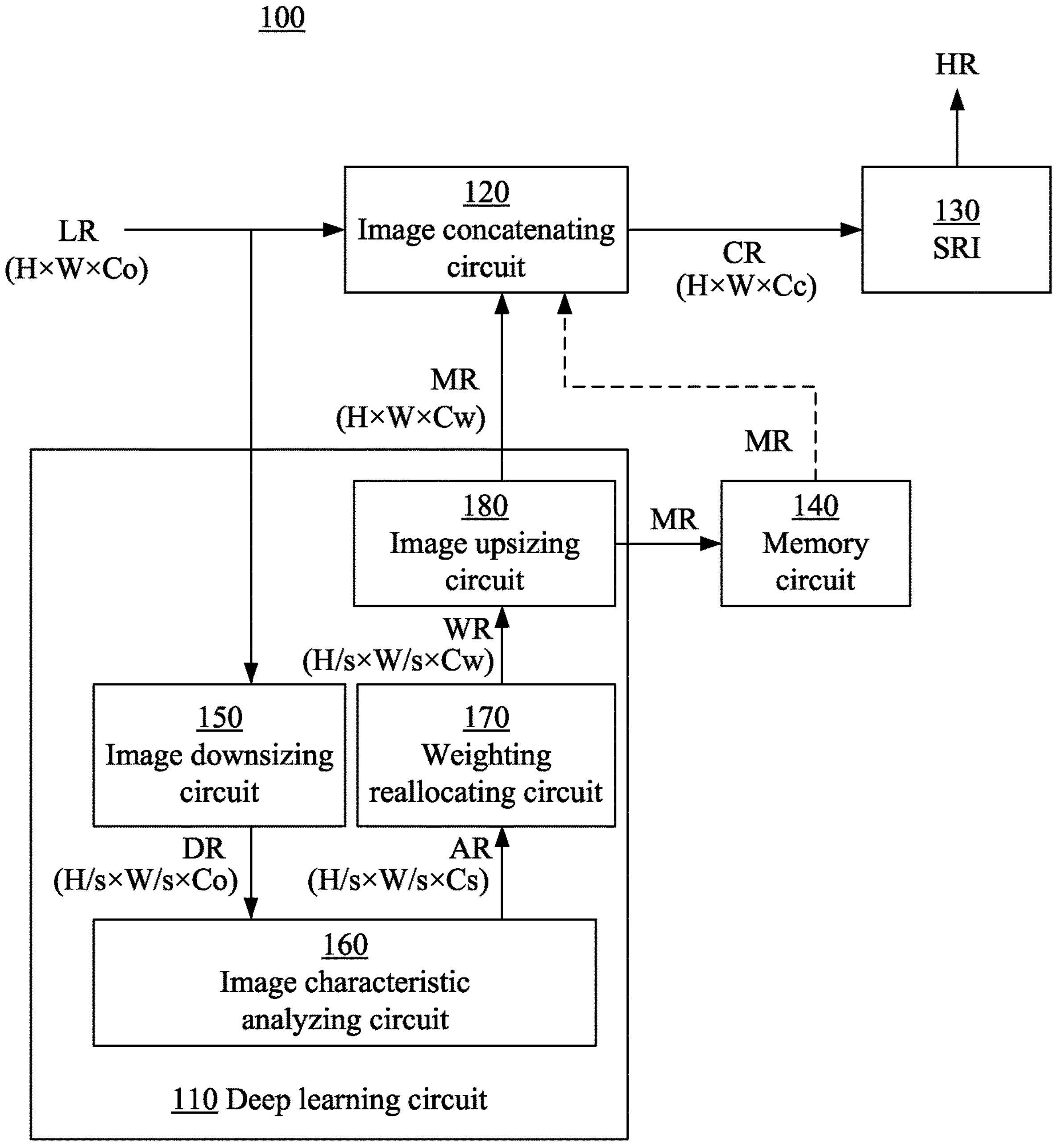
FIG. 1 illustrates a block diagram of an image enlarging apparatus having deep learning mechanism according to an embodiment of the present invention.

Reference is now made to FIG. 1. FIG. 1 illustrates a block diagram of an image enlarging apparatus 100 having deep learning mechanism according to an embodiment of the present invention. The image enlarging apparatus 100 is configured to perform super resolution image enlarging on an input image LR by using deep learning mechanism to generate an output image HR.

In an embodiment, the input image LR has an original size of H×W and an original channel number of Co, in which H is height, W is width and Co corresponds to such as, but not limited to different color channels. For example, the input image LR may have the original channel number of 3 (Co=3) corresponding to a red color channel (R), a green color channel (G) and a blue color channel (B). When the size ratio between the output image HR and the input image LR is n, the output image HR has an output size of nH×nW and an output channel number that equals to the original channel number Co.

The image enlarging apparatus 100 includes a deep learning circuit 110, an image concatenating circuit 120, a super-resolution image enlarging circuit 130 (abbreviated as SRI in FIG. 1) and a memory circuit 140.

The deep learning circuit 110 includes the an image downsizing circuit 150, an image characteristic analyzing circuit 160, a weighting reallocating circuit 170 and an image upsizing circuit 180.

The image downsizing circuit 150 is configured to downsize the input image LR to generate a downsized image DR. In an embodiment, the image downsizing circuit 150 downsizes the input image LR with a ratio "s". As a result, the downsized image DR has a downsized size of H/s×W/s and has the original channel number of Co.

The image characteristic analyzing circuit 160 is configured to analyze the downsized image LR according to a plurality of image characteristics to generate the categorization map AR. In an embodiment, the categorization map AR has the downsized size of H/s×W/s and has an analysis channel number Cs, wherein the analysis channel number Cs is the number of the image characteristics.

In an embodiment, the image characteristic analyzing circuit 160 is a semantic segmentation circuit, a local frequency detection circuit or a combination thereof. Further, the image characteristic analyzing circuit 160 may use the filtering technology of Sobel or discrete cosine transform (DCT) to perform analysis according to practical requirements.

The image characteristics include such as, but not limited to a plurality of object classes, a plurality of frequency ranges or a combination thereof. The object classes may include such as, but not limited to a plant, a building, a sky or other objects. The frequency ranges may include such as, but not limited to a high frequency range (e.g., a larger variation of parameters of the image) and a low frequency range (e.g., a smaller variation of parameters of the image).

In an embodiment, an object class or a frequency range corresponds to one analysis channel. For example, when the analysis channel number Cs is 3, such 3 analysis channels correspond to the plant, the building and the sky respectively. When the image characteristic analyzing circuit 160 determines that a pixel in the downsized image LR corresponds to the plant, the values of these 3 analysis channels are 1, 0 and 0, in which these values indicate that such a pixel corresponds to the plant instead of either the building or the sky.

The weighting reallocating circuit 170 is configured to perform weighting reallocating on the categorization map AR according to a plurality of groups of image weighting parameters corresponding to the image characteristics to generate a weighting reallocating map WR.

In an embodiment, the weighting reallocating map WR has the downsized size of H/s×W/s and a weighting reallocating channel number of Cw, in which the weighting reallocating channel number is the number of these groups of the image weighting parameters. In an embodiment, the groups of the image weighting parameters correspond to a de-noise process, a sharpness adjusting process, a texture enhancement processor a combination thereof.

In an embodiment, a group of the image weighting parameters corresponds to a weighting reallocating channel. For example, the weighting reallocating channel number is 2, and a group of parameters corresponding to the de-noise process and another group of parameters corresponding to the texture enhancement process are correspondingly generated for such 2 weighting reallocating channels according to the categorization map AR. More specifically, in an embodiment, when the categorization map AR includes a channel corresponding to the object class of sky, the weighting reallocating circuit 170 may generate the weighting reallocating map WR that includes a group of image weighting parameters corresponding to the de-noise process such that the sky in the image becomes clean after being processed by such a group of image weighting parameters.

The image upsizing circuit 180 is configured to upsize the weighting reallocating map WR to generate an adjusting map MR.

In an embodiment, the image upsizing circuit 180 upsizes the weighting reallocating map WR with a ratio "s". As a result, the adjusting map MR has the original size of H×W and a weighting reallocating channel number of Cw.

The image concatenating circuit 120 is configured to concatenate the input image LR and adjusting map MR to generate a concatenated image CR.

In an embodiment, the concatenated image CR has the original size of H×W and a concatenated channel number Cc, wherein the concatenated channel number Cc is a sum of the original channel number Co and the weighting reallocating channel number Cw, namely Cc=Co+Cw.

The super-resolution image enlarging circuit 130 is configured to perform super-resolution enlarging on the concatenated image CR to generate the output image HR.

The concatenated image CR not only includes the input image LR, but also includes the additional adjusting map MR. As a result, the super-resolution image enlarging circuit 130 uses the adjusting map MR as control items to perform pixel-by-pixel modification to enhance the enlarged input image LR to accomplish an image enlarged result having super resolution mechanism applied thereto.

In an embodiment, a first frame refresh rate of the input image LR is N times of a second frame refresh rate of the adjusting map MR.

In an embodiment, the first frame refresh rate of the input image LR can be the same as the second frame refresh rate of the adjusting map MR (i.e., N=1), such that the speed that the deep learning circuit 110 generates the adjusting map MR is the same as the frame refresh rate of the input image LR. Under such a condition, the image concatenating circuit 120 may directly receive the adjusting map MR from the image upsizing circuit 180 to be concatenated with the input image LR.

However, since the processing of the deep learning circuit 110 is actually performed on a path independent from the image enlarging path, in another embodiment, the deep learning circuit 110 may be configured to set the second frame refresh rate of the adjusting map MR to be smaller than the first frame refresh rate of the input image LR. For example, when the first frame refresh rate of the input image LR is 60 Hz, the deep learning circuit 110 may set the second frame refresh rate of the adjusting map MR to be 30 Hz (i.e., N=2). As a result, the adjusting map MR has a frame delay relative to the input image LR.

Under such a condition, the memory circuit 140 is configured to store the adjusting map MR, such that the image concatenating circuit 120 is configured to retrieve the adjusting map MR through the dashed line path to be concatenated with the input image LR. Under the condition that the first frame refresh rate is two times of the second frame refresh rate described above, the image concatenating circuit 120 concatenates each of two consecutive input images LR with the same adjusting map MR so as to generate two concatenated images CR and perform super-resolution enlarging thereon to generate two output images HR.

Under such a condition, the system operation amount and the bandwidth of the image enlarging apparatus 100 can be adjusted dynamically. Since the adjusting map MR is not needed to be synchronous to the input image LR, the resource of the image enlarging apparatus 100 is not over-consumed.

It is appreciated that in practical implementation, the circuits included in the deep learning circuit 110 may store the processed content in the memory circuit 140 during the processing performed on the images and the maps so as to be retrieved by other circuits without being transmitted between the circuits. The present invention is not limited to the signal transmission method illustrated in FIG. 1.

The image enlarging apparatus having deep learning mechanism of the present invention performs deep learning on the input image according to different image characteristics by a deep learning circuit disposed on a path independent from the image enlarging processing path so as to enhance the enlarged input image to accomplish an image enlarged result having super resolution mechanism applied thereto.

It is appreciated that the components included in the image enlarging apparatus 100 may be implemented by independent hardware circuits or by software modules generated by operation of software. The present invention is not limited thereto.

Figure 2:
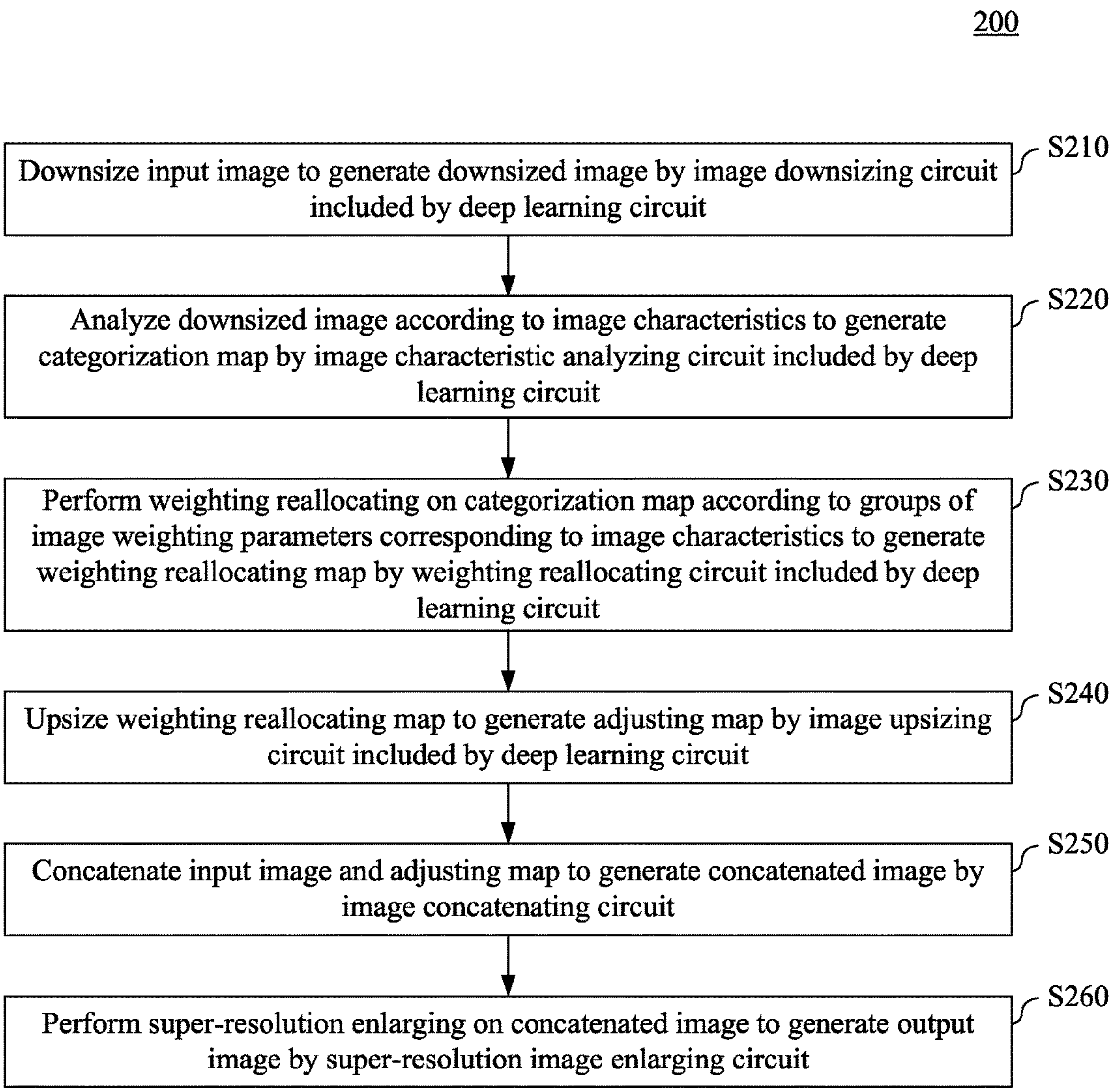
FIG. 2 illustrates a flow chart of an image enlarging method having deep learning mechanism according to an embodiment of the present invention.

Reference is now made to FIG. 2. FIG. 2 illustrates a flow chart of an image enlarging method 200 having deep learning mechanism according to an embodiment of the present invention.

Besides the apparatus described above, the present invention further discloses the image enlarging method 200 that can be used in such as, but not limited to the image enlarging apparatus 100 illustrated in FIG. 1. An embodiment of the image enlarging method 200 is illustrated in FIG. 2 and includes the steps outlined below.

In step S210, the input image LR is downsized to generate the downsized image DR by the image downsizing circuit 150 included by the deep learning circuit 110.

In step S220, the downsized image DR is analyzed according to the plurality of image characteristics to generate the categorization map AR by the image characteristic analyzing circuit 160 included by the deep learning circuit 110.

In step S230, weighting reallocating is performed on the categorization map AR according to the plurality of groups of image weighting parameters corresponding to the image characteristics to generate the weighting reallocating map WR by the weighting reallocating circuit 170 included by the deep learning circuit 110.

In step S240, the weighting reallocating map WR is upsized to generate the adjusting map MR by the image upsizing circuit 180 included by the deep learning circuit 110.

In step S250, the input image LR and the adjusting map MR are concatenated to generate the concatenated image CR by the image concatenating circuit 120.

In step S260, super-resolution enlarging is performed on the concatenated image CR to generate the output image HR by the super-resolution image enlarging circuit 130.

It is appreciated that the embodiments described above are merely an example. In other embodiments, it is appreciated that many modifications and changes may be made by those of ordinary skill in the art without departing, from the spirit of the invention.

In summary, the image enlarging apparatus and the image enlarging method thereof having deep learning mechanism perform deep learning on the input image according to different image characteristics by a deep learning circuit disposed on a path independent from the image enlarging processing path so as to enhance the enlarged input image to accomplish an image enlarged result having super resolution mechanism applied thereto.

The aforementioned descriptions represent merely the preferred embodiments of the present disclosure, without any intention to limit the scope of the present disclosure thereto. Various equivalent changes, alterations, or modifications based on the claims of present disclosure are all consequently viewed as being embraced by the scope of the present disclosure.

What is claimed is:

1. An image enlarging apparatus having deep learning mechanism comprising:

a deep learning circuit comprising:

an image downsizing circuit configured to downsize an input image to generate a downsized image;

an image characteristic analyzing circuit configured to analyze the downsized image according to a plurality of image characteristics to generate a categorization map;

a weighting reallocating circuit configured to perform weighting reallocating on the categorization map according to a plurality of groups of image weighting parameters corresponding to the image characteristics to generate a weighting reallocating map; and an image upsizing circuit configured to upsize the weighting reallocating map to generate an adjusting map;

an image concatenating circuit configured to concatenate the input image and the adjusting map to generate a concatenated image; and a super-resolution image enlarging circuit configured to perform super-resolution enlarging on the concatenated image to generate an output image.

2. The image enlarging apparatus of claim 1, wherein the input image has an original size and an original channel number and the downsized image has a downsized size and the original channel number;

the categorization map has the downsized size and an analysis channel number, wherein the analysis channel number is the number of the image characteristics;

the weighting reallocating map has the downsized size and a weighting reallocating channel number, wherein the weighting reallocating channel number is the number of the plurality of groups of the image weighting parameters;

the adjusting map has the original size and the weighting reallocating channel number; and the concatenated image has the original size and a concatenated channel number, wherein the concatenated channel number is a sum of the original channel number and the weighting reallocating channel number.

3. The image enlarging apparatus of claim 1, wherein a first frame refresh rate of the input image is N times of a second frame refresh rate of the adjusting map.

4. The image enlarging apparatus of claim 3, further comprising a memory circuit configured to store the adjusting map such that the image concatenating circuit is configured to retrieve the adjusting map from the memory circuit to be concatenated with the input image.

5. The image enlarging apparatus of claim 1, wherein the image characteristic analyzing circuit is a semantic segmentation circuit, a local frequency detection circuit or a combination thereof.

6. The image enlarging apparatus of claim 1, wherein the image characteristics comprise a plurality of object classes, a plurality of frequency ranges or a combination thereof.

7. The image enlarging apparatus of claim 1, wherein the plurality of groups of image weighting parameters correspond to a de-noise process, a sharpness adjusting process a texture enhancement processor or a combination thereof.

8. An image enlarging method having deep learning mechanism used in an image enlarging apparatus, comprising:

downsizing an input image to generate a downsized image by an image downsizing circuit comprised by a deep learning circuit;

analyzing the downsized image according to a plurality of image characteristics to generate a categorization map by an image characteristic analyzing circuit comprised by the deep learning circuit;

performing weighting reallocating on the categorization map according to a plurality of groups of image weighting parameters corresponding to the image characteristics to generate a weighting reallocating map by a weighting reallocating circuit comprised by the deep learning circuit;

upsizing the weighting reallocating map to generate an adjusting map by an image upsizing circuit comprised by the deep learning circuit;

concatenating the input image and the adjusting map to generate a concatenated image by an image concatenating circuit; and performing super-resolution enlarging on the concatenated image to generate an output image by a super-resolution image enlarging circuit.

9. The image enlarging method of claim 8, wherein the input image has an original size and an original channel number and the downsized image has a downsized size and the original channel number;

the categorization map has the downsized size and an analysis channel number, wherein the analysis channel number is the number of the image characteristics;

the weighting reallocating map has the downsized size and a weighting reallocating channel number, wherein the weighting reallocating channel number is the number of the plurality of groups of the image weighting parameters;

the adjusting map has the original size and the weighting reallocating channel number; and the concatenated image has the original size and a concatenated channel number, wherein the concatenated channel number is a sum of the original channel number and the weighting reallocating channel number.

10. The image enlarging method of claim 8, wherein a first frame refresh rate of the input image is N times of a second frame refresh rate of the adjusting map.

11. The image enlarging method of claim 10, further comprising:

storing the adjusting map by a memory circuit such that the image concatenating circuit is configured to retrieve the adjusting map from the memory circuit to be concatenated with the input image.

12. The image enlarging method of claim 8, wherein the image characteristic analyzing circuit is a semantic segmentation circuit, a local frequency detection circuit or a combination thereof.

13. The image enlarging method of claim 8, wherein the image characteristics comprise a plurality of object classes, a plurality of frequency ranges or a combination thereof.

14. The image enlarging method of claim 8, wherein the plurality of groups of image weighting parameters correspond to a de-noise process, a sharpness adjusting process a texture enhancement processor or a combination thereof.

* * * * *